United States Patent
Tamba

(10) Patent No.: US 9,810,342 B2
(45) Date of Patent: Nov. 7, 2017

(54) SOLENOID SPOOL VALVE

(75) Inventor: Richard Terrence Tamba, Castle Hill (AU)

(73) Assignee: NT Consulting International Pty Limited, Castle Hill (AU)

( * ) Notice: Subject to any disclaimer, the term of this patent is extended or adjusted under 35 U.S.C. 154(b) by 0 days.

(21) Appl. No.: 13/579,840

(22) PCT Filed: Feb. 18, 2011

(86) PCT No.: PCT/AU2011/000174
§ 371 (c)(1),
(2), (4) Date: Sep. 14, 2012

(87) PCT Pub. No.: WO2011/100800
PCT Pub. Date: Aug. 25, 2011

(65) Prior Publication Data
US 2012/0326066 A1 Dec. 27, 2012

(30) Foreign Application Priority Data
Feb. 18, 2010 (AU) ................................ 2010900682

(51) Int. Cl.
*F16K 11/07* (2006.01)
*F16K 31/06* (2006.01)

(52) U.S. Cl.
CPC ..... *F16K 31/0613* (2013.01); *Y10T 137/8671* (2015.04); *Y10T 137/86622* (2015.04)

(58) Field of Classification Search
CPC ............. F16K 11/0716; F16K 31/0696; F16K 39/022; F16K 31/0613; Y10T 137/8671; Y10T 137/86622

USPC .................................... 137/625.65, 625.69
See application file for complete search history.

(56) References Cited

U.S. PATENT DOCUMENTS

| | | | | |
|---|---|---|---|---|
| 3,064,464 A * | 11/1962 | Black et al. | ............. | 137/625.69 |
| 3,087,469 A * | 4/1963 | Evans | ....................... | 137/625.69 |
| 3,527,257 A * | 9/1970 | Kling | ....................... | 137/625.65 |
| 3,552,433 A * | 1/1971 | Mason | ..................... | 137/625.69 |
| 3,704,727 A * | 12/1972 | Adahan | ..................... | 137/625.65 |
| 4,574,686 A * | 3/1986 | Budzich | ................... | 137/625.65 |
| 6,283,154 B1 * | 9/2001 | Rizk et al. | ............... | 137/625.65 |
| 6,386,220 B1 * | 5/2002 | Koenings | ................. | 137/625.65 |
| 6,796,322 B2 * | 9/2004 | Sen | .......................... | 137/625.65 |
| 7,717,132 B2 * | 5/2010 | Burkhart et al. | ......... | 137/625.65 |
| 7,987,871 B2 * | 8/2011 | Cho et al. | ................. | 137/625.65 |
| 8,919,381 B2 * | 12/2014 | Stafford et al. | .......... | 137/625.69 |

(Continued)

OTHER PUBLICATIONS

International Search Report issued in International Application No. PCT/AU2011/000174, dated Mar. 18, 2011.

*Primary Examiner* — Craig J Price
(74) *Attorney, Agent, or Firm* — Quarles & Brady LLP

(57) ABSTRACT

A solenoid spool valve including a spool valve having a sleeve provided with a supply pressure port, a control pressure port, an exhaust port and a spool supported in the sleeve for axial displacement within the sleeve; and an electromagnetic actuator for providing an axial drive force to the spool in a first axial direction; wherein the spool has a first piston with a first land for opening/closing the supply pressure port and a second piston with a second land for opening/closing the exhaust port, wherein the first piston has a larger piston face surface area in fluid communication with the control pressure port than does the second piston.

15 Claims, 5 Drawing Sheets

(56) References Cited

U.S. PATENT DOCUMENTS

| | | | |
|---|---|---|---|
| 8,973,611 B2* | 3/2015 | Schudt et al. | 137/625.65 |
| 8,978,701 B2* | 3/2015 | Miyazoe et al. | 137/625.69 |
| 9,022,346 B2* | 5/2015 | Najmolhoda et al. | 137/625.65 |
| 2003/0164193 A1 | 9/2003 | Lou | |
| 2006/0086396 A1* | 4/2006 | Ando | 137/625.65 |
| 2010/0327206 A1* | 12/2010 | Nishimine et al. | 251/321 |
| 2015/0013805 A1* | 1/2015 | Terao | 137/625.69 |
| 2015/0047720 A1* | 2/2015 | Tamba | 137/625.69 |

* cited by examiner

SOLENOID SPOOL VALVE

This application is a 35 U.S.C. §371 national stage filing of International Application No. PCT/AU2011/000174, having an international filing date of Feb. 18, 2011. This application claims the benefit of priority to Australian Patent Application No. 2010900682, filed Feb. 18, 2010. The entire contents of each of the above-referenced applications are expressly incorporated herein by reference.

FIELD OF THE INVENTION

This invention relates to a solenoid spool valve and, more particularly but not exclusively, to a two land high flow solenoid spool valve which enables higher control pressures to be used without necessitating a correspondingly larger electromagnetic actuator.

BACKGROUND OF THE INVENTION

The applicant has identified that current design high flow solenoids have an equal area spool, meaning that lands of the spool have the same external dimension, usually the outside diameter, resulting in the lands having the same surface area for driving the spool in response to fluid pressure against the lands. To increase the pressure obtained from the current design solenoid spool valves requires the spool diameter to be increased. As the diameters of each of the lands on the spool increase, the force against a diaphragm of the solenoid spool valve increases, necessitating a magnet (coil) size of an electromagnetic actuator to be increased. The applicant has determined that it would be desirable to obviate the necessity to increase the magnet (coil) size with pressure capacity of the solenoid spool valve.

Furthermore, the applicant has also identified that increasing diameters of all lands on the spool in accordance with current practice typically increases leakage to an exhaust port of the solenoid spool valve, requiring a larger pump to compensate for the leakage.

Examples of the invention seek to solve, or at least ameliorate, one or more disadvantages of previous solenoid spool valves.

SUMMARY OF THE INVENTION

In accordance with one aspect of the present invention, there is provided a solenoid spool valve including a spool valve having a sleeve provided with a supply pressure port, a control pressure port, an exhaust port and a spool supported in the sleeve for axial displacement within the sleeve; and an electromagnetic actuator for providing an axial drive force to said spool in a first axial direction; wherein the spool has a first piston with a first land for opening/closing the supply pressure port and a second piston with a second land for opening/closing the exhaust port, wherein the first piston has a larger piston face surface area in fluid communication with the control pressure port than does the second piston.

Preferably, the first piston has one piston face (b) in fluid communication with the control pressure port arranged such that force of fluid against said one piston face acts on the spool in an axial direction away from the electromagnetic actuator, and an opposite piston face (a) in fluid communication with a feedback orifice arranged such that force of fluid against said opposite piston face acts on the spool in an axial direction toward the electromagnetic actuator.

More preferably, the feedback orifice supplies fluid at the same control pressure as the control pressure port. Even more preferably, the feedback orifice is in fluid communication with the control pressure port. In one example, the orifice is formed as a duct extending through the first piston to communicate with the control pressure port.

Preferably, the face (c) of the second piston in fluid communication with the control pressure port is arranged such that force of fluid against said face acts on the spool in an axial direction toward the electromagnetic actuator.

Preferably, the spool is arranged such that, the combined force on the spool from fluid against piston faces of the spool is independent of the transverse extent of the first piston, owing to equal and opposite face surface areas of the first piston. More preferably, the first piston is cylindrical and the combined force on the spool from fluid against piston faces of the spool is independent of an outside diameter of the first piston.

Preferably, the spool is arranged such that, the combined force on the spool from fluid against piston faces of the spool is given by the equation:

$$\text{combined force} = A + C - B,$$

where A, B and C are the fluid forces acting on faces a, b and c, respectively.

In a preferred form, the first piston has a larger diameter than the second piston. More preferably, as a result of the larger diameter of the first piston, the valve has relatively high flow from the supply pressure port to the control pressure port and relatively low flow from the control pressure port to the exhaust port.

In accordance with another aspect of the present invention, there is provided a range of solenoid spool valves, each of which is as described above, wherein each of the solenoid spool valves has a different first piston diameter to second piston diameter ratio to provide different pressure capabilities, and wherein each of the solenoid spool valves has an identical electromagnetic actuator.

In one particular example, each of the solenoid spool valves has a different first piston diameter, and the same second piston diameter.

BRIEF DESCRIPTION OF THE DRAWINGS

The invention is described, by way of non-limiting example only, with reference to the accompanying drawings in which.

DETAILED DESCRIPTION

Figure 1A:
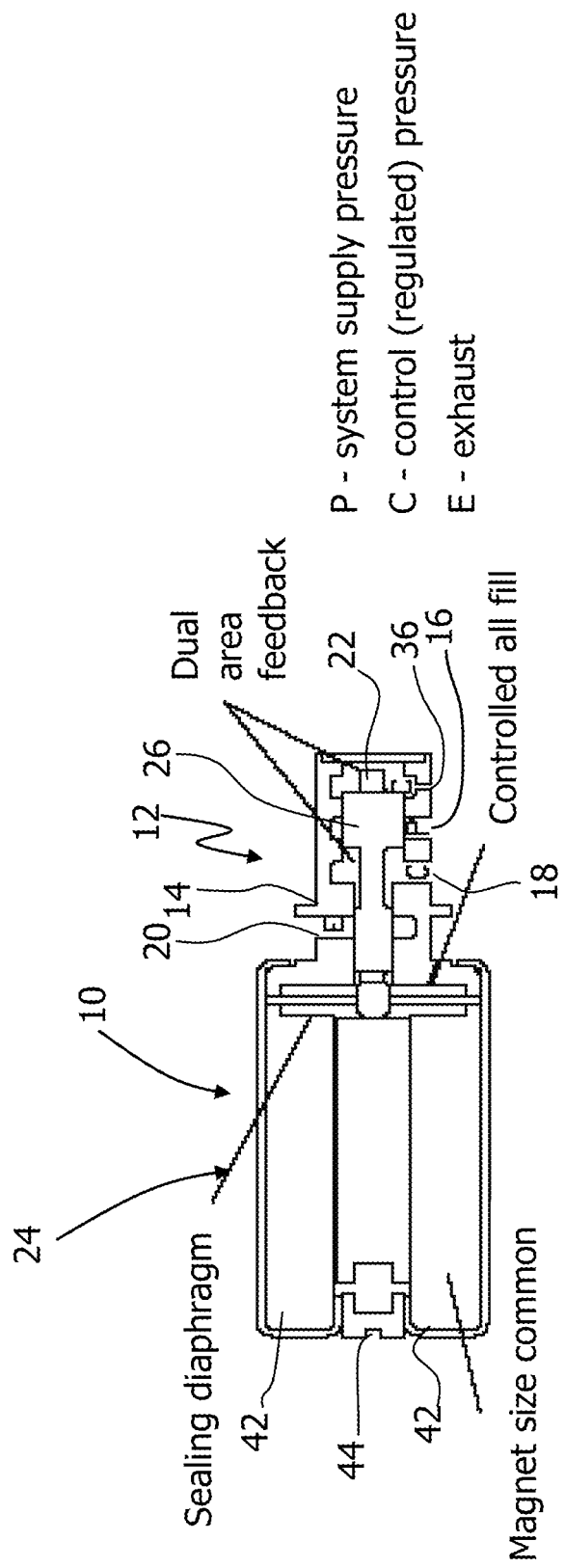
FIG. 1(a) is a diagrammatic cross-sectional view of a solenoid spool valve in accordance with a first example of the present invention.

With reference to FIG. 1(a) there is shown a solenoid spool valve 10 used for supplying varying pressures from a system supply pressure to an object (such as, for example, a friction clutch). The solenoid spool valve 10 shown has an increased supply pressure diameter of the spool while leaving the regulated pressure end of the spool at the original diameter. By virtue of this configuration, the resultant force on a diaphragm of the valve 10 is independent of the increased supply pressure diameter.

More specifically, the solenoid spool valve 10 includes a spool valve 12 having a sleeve 14 provided with a supply pressure port 16, a control pressure port 18, an exhaust port 20 and a spool 22 supported in the sleeve 14 for axial displacement within the sleeve 14. The solenoid spool valve 10 also includes an electromagnetic actuator 24 for providing an axial drive force to the spool 22 in a first axial direction away from the electromagnetic actuator so as to operate the spool valve 12. The spool 22 has a first piston 26 with a first land 28 for opening/closing the supply pressure port 16, and a second piston 30 with a second land 32 for opening/closing the exhaust port 20. The first piston 26 has a larger piston face surface area 34 in fluid communication with the control pressure port 18 than does the second piston 30.

The first piston 26 has one piston face (b) in fluid communication with the control pressure port 18, arranged such that force of fluid against the face (b) acts on the spool 22 in an axial direction away from the electromagnetic actuator 24. The first piston 26 also has an opposite piston face (a) in fluid communication with a feedback orifice 36 arranged such that force of fluid against the opposite piston face (a) acts on the spool 22 in an axial direction toward the electromagnetic actuator 24. The feedback orifice 36 supplies fluid at the same control pressure as the control pressure port 18. In the example shown in FIG. 1(a), the feedback orifice 36 is formed in the sleeve 14 so as to provide fluid at the control pressure to piston face (a) of the first piston 26.

Figure 1B:
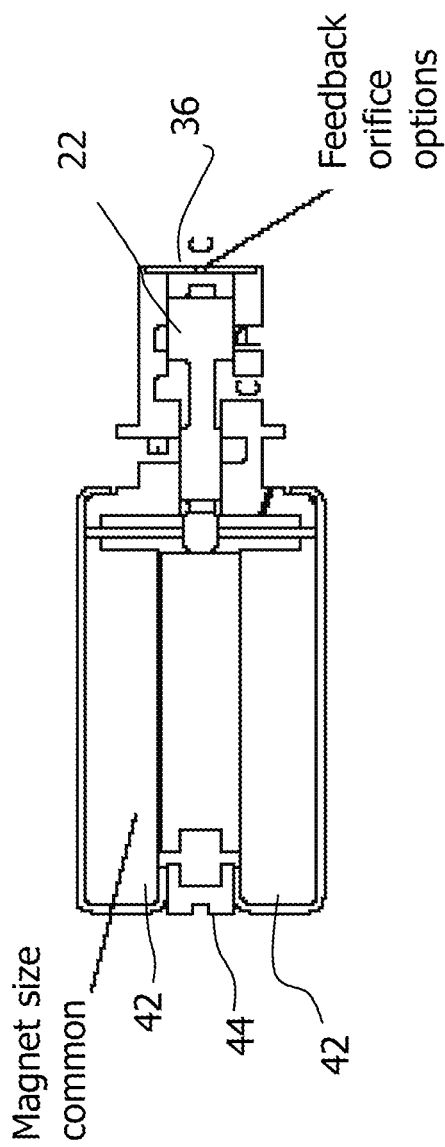
FIG. 1(b) is a diagrammatic cross-sectional view of a solenoid spool valve in accordance with a second example of the present invention.
Figure 1C:
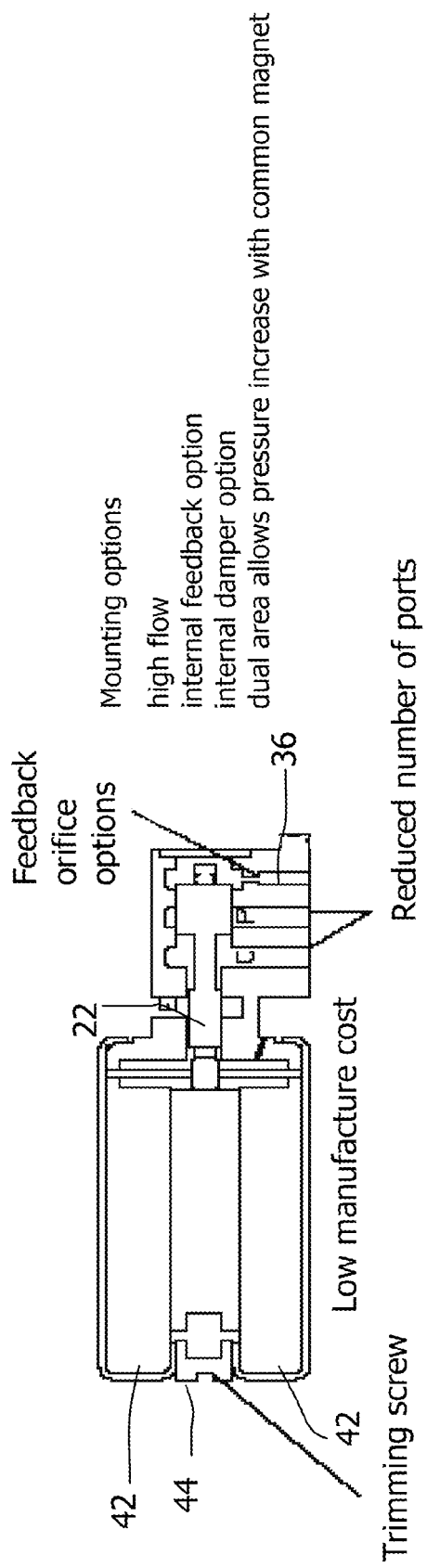
FIG. 1(c) is a diagrammatic cross-sectional view of a solenoid spool valve in accordance with a third example of the present invention.
Figure 1D:
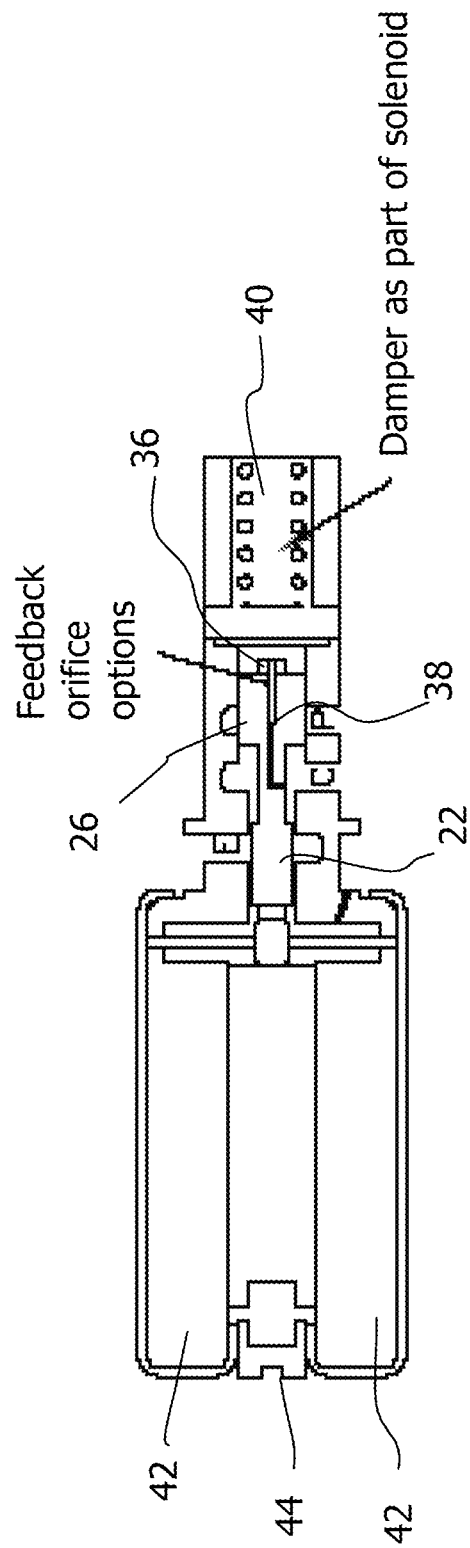
FIG. 1(d) is a diagrammatic cross-sectional view of a solenoid spool valve in accordance with a fourth example of the present invention.

FIGS. 1(b) to 1(d) show alternative configurations of solenoid spool valves 10 in accordance with other examples of the present invention. More specifically, with reference to FIG. 1(b), the solenoid spool valve 10 shown in this example is similar to the example shown in FIG. 1(a), except in that the feedback orifice 36 is located in an end of the spool valve 12, rather than in a side wall of the sleeve 14. With reference to the example shown in FIG. 1(c), the feedback orifice 36 is provided in a sidewall of the sleeve 14 (in a manner similar to that in FIG. 1(a)), however this example differs in that the sleeve 14 is non-circular, in contrast to the examples in FIGS. 1(a), 1(b) and 1(d). This is made evident by the cross-sectional depiction of the sleeve 14 in FIG. 1(c), wherein the sleeve 14 extends to a greater degree below the spool 22 than it does above the spool 22.

The solenoid spool valve 10 shown in FIG. 1(d) has a feedback orifice 36 formed as a duct 38 extending through the first piston 26 to communicate with the control pressure port 18. Also, the example shown in FIG. 1(d) incorporates a damper 40 as part of the solenoid spool valve 10. As can be seen, the size of the magnet 42 is common to all four versions of the solenoid spool valve 10 shown in FIGS. 1(a) to 1(d), as all four versions use an identical electromagnetic actuator 24.

In each of the solenoid spool valves 10 shown in FIGS. 1(a) to 1(d), the face (c) of the second piston 30 in fluid communication with the control pressure port 18 is arranged such that force of fluid against that face (c) acts on the spool 22 in an axial direction toward the electromagnetic actuator 24.

Figure 2:
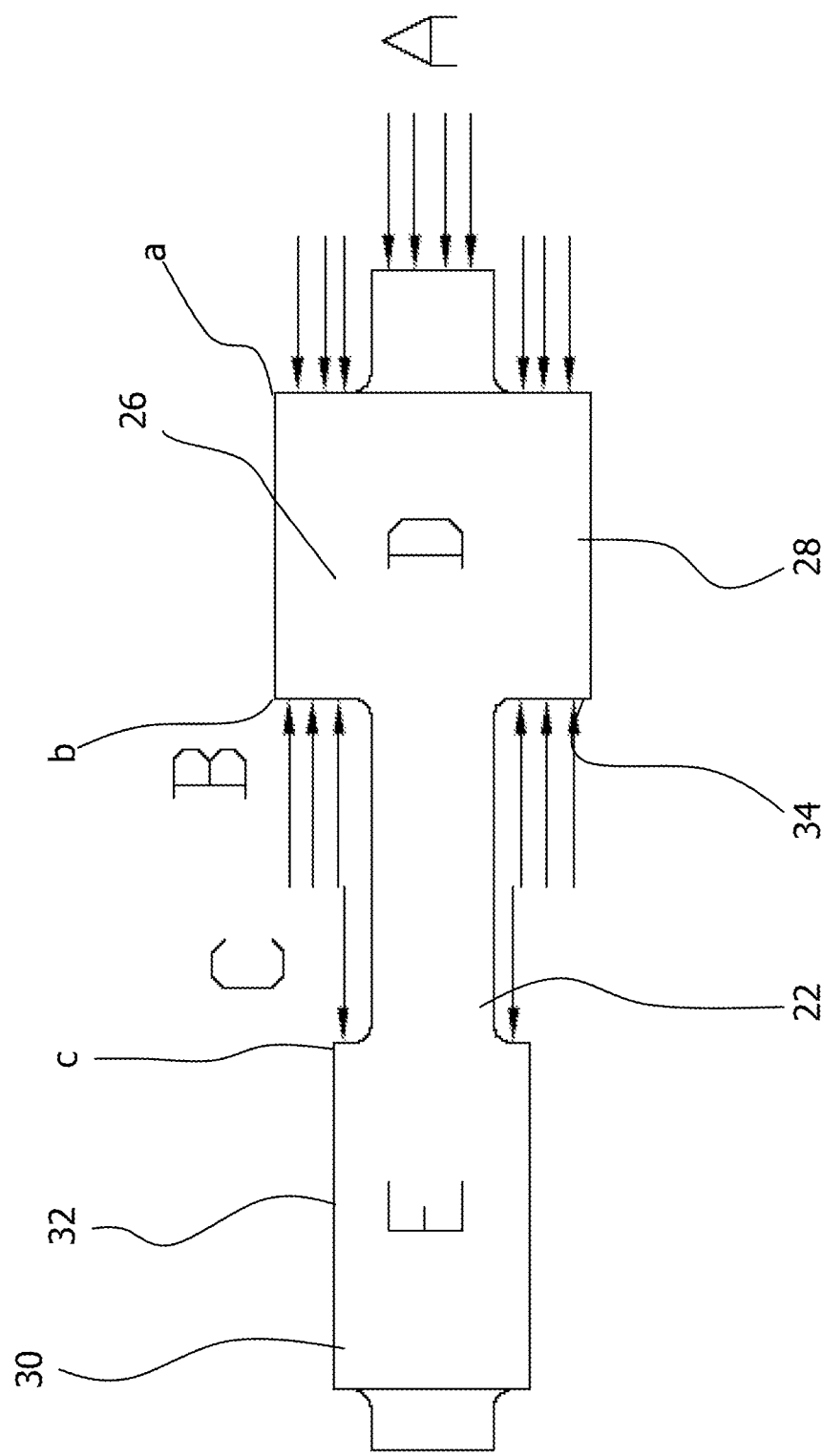
FIG. 2 shows detail of a spool of a solenoid spool valve the same or similar to those shown in FIGS. 1(a) to 1(d).

With reference to FIG. 2, the spool 22 is arranged such that, for any stationary position of the spool valve (including when the supply pressure port 16 of the solenoid spool valve 10 is closed as shown), the combined force on the spool 22 from fluid against piston faces of the spool 22 is independent of the transverse extent of the first piston 26. This independence is due to equal and opposite face surface areas of the first piston 26, which effectively cancel each other. Where the first piston 26 is cylindrical, the combined force on the spool 22 from fluid against piston faces of the spool 22 is independent of an outside diameter of the first piston 26. With regard to the lettering shown in FIG. 2, the combined force on the spool 22 from fluid against piston faces of the spool 22 is given by the equation:

Combined force=$A+C-B$, where $A$, $B$ and $C$ are the fluid forces acting on faces ($a$), ($b$) and ($c$), respectively.

In this way, the force on the annular part of surface (a) represented by the six outermost arrows of A cancel out the forces on surface (b) represented by the six arrows of force B, such that the combined force is truly independent of the outside diameter of the first piston 26.

Where the spool is cylindrical, the first piston 26 has a larger diameter than the second piston 30 so that the first piston 26 has a larger piston face surface area in fluid communication with the control pressure port 18 than does the second piston 30. As a result of the larger diameter of the first piston 26, the valve 10 has relatively high flow from the supply pressure port 16 to the control pressure port 18 and relatively low flow from the control pressure port 18 to the exhaust port 20. This is desirable, as the relatively low flow from the control pressure port 18 to the exhaust port 20 minimises leakage such that a smaller pump may be used.

Advantageously, the ability to increase the diameter of the first piston 26 enables higher control pressure to be used, assisting in the regulation of higher pressures and facilitating quick action of the solenoid spool valve 10. Also, as the size of magnet 42 is independent of the flow area design, the pressure can be adjusted by varying the diameter of the first piston 26 while maintaining a common coil/core size between pressure/flow variants. This may assist in maintaining an overall short length when compared with other high flow solenoids, and facilitates the provision of a family of solenoid designs using a common magnet coil/core and body.

The tuneable feedback orifice 36 may have a maximised effect by being located to cooperate with the largest area of the spool 22.

The solenoid spool valve 10 may have a filled canister whereby oil is provided inside the electromagnetic actuator to change the natural frequency of the solenoid spool valve 10. Also, a trimming screw 44 may be mounted as shown in FIGS. 1(a) to 1(d).

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:
1. A solenoid spool valve including:
   a spool valve having a sleeve provided with a supply pressure port, a control pressure port, an exhaust port and a spool supported in the sleeve for axial displacement within the sleeve; and
   an electromagnetic actuator for providing an axial drive force to said spool in a first axial direction;
   wherein the spool has a first piston with a first land for opening/closing the supply pressure port to/from fluid communication with the control pressure port and a second piston with a second land for opening/closing the exhaust port to/from fluid communication with the control pressure port,
   the first piston having a larger piston face surface area in fluid communication with the control pressure port than does the second piston to reduce leakage from the control pressure port to the exhaust port; and
   a feedback to equalize pressure on equal and opposite face surface areas of the first piston,
   wherein the feedback includes at least one of: a feedback orifice through a sidewall or end wall of the sleeve or end portion that connects to a fluid supply; and a feedback orifice formed as a duct extending through the first piston to communicate with the control pressure port, and
   wherein the spool is arranged such that, for every stationary position of the spool valve, a combined force on the spool from fluid against piston faces of the spool is independent of a transverse extent of the first piston.

2. A solenoid spool valve as claimed in claim 1, wherein the first piston has one piston face (b) in fluid communication with the control pressure port arranged such that force of fluid against said one piston face acts on the spool in an axial direction away from the electromagnetic actuator, and an opposite piston face (a) in fluid communication with the feedback orifice arranged such that force of fluid against said opposite piston face acts on the spool in an axial direction toward the electromagnetic actuator.

3. A solenoid spool valve as claimed in claim 2, wherein the feedback orifice supplies fluid at the same control pressure as the control pressure port.

4. A solenoid spool valve as claimed in claim 2, wherein a face (c) of the second piston in fluid communication with the control pressure port is arranged such that force of fluid against said face acts on the spool in an axial direction toward the electromagnetic actuator.

5. A solenoid spool valve as claimed in claim 4, wherein the spool is arranged such that, the combined force on the spool from fluid against piston faces of the spool is independent of a transverse extent of the first piston, owing to the equal and opposite face surface areas of the first piston.

6. A solenoid spool valve as claimed in claim 5, wherein the spool is arranged such that, the combined force on the spool from fluid against the piston faces of the spool is given by the equation:

$$\text{combined force} = A + C - B,$$

where A, B, and C are fluid forces acting on the one piston face (b) of the first piston, the opposite piston face (a) of the second piston, and the face (c) of the second piston, respectively.

7. A solenoid spool valve as claimed in claim 1, wherein a face (c) of the second piston in fluid communication with the control pressure port is arranged such that force of fluid against said face acts on the spool in an axial direction toward the electromagnetic actuator.

8. A solenoid spool valve as claimed in claim 1, wherein the first piston is cylindrical and the combined force on the spool from fluid against the piston faces of the spool is independent of an outside diameter of the first piston.

9. A solenoid spool valve as claimed in claim 8, wherein the spool is arranged such that, the combined force on the spool from fluid against the piston faces of the spool is given by the equation:

$$\text{combined force} = A + C - B,$$

where A, B and C are fluid forces acting on a first piston face (a), a second piston face (b) and a third piston face (c), respectively.

10. A solenoid spool valve as claimed in claim 1, wherein the spool is arranged such that, the combined force on the spool from fluid against the piston faces of the spool is given by the equation:

$$\text{combined force} = A + C - B,$$

where A, B and C are fluid forces acting on a first piston face (a), a second piston face (b) and a third piston face (c), respectively.

11. A solenoid spool valve as claimed in claim 1, wherein the first piston has a larger diameter than the second piston.

12. A solenoid spool valve as claimed in claim 11, wherein as a result of the larger diameter of the first piston, the valve has relatively high flow from the supply pressure port to the control pressure port and relatively low flow from the control pressure port to the exhaust port.

13. A range of solenoid spool valves, each of which is as claimed in claim 1, wherein each of the solenoid spool valves has a different first piston diameter to second piston diameter ratio to provide different pressure capabilities, and wherein each of the solenoid spool valves has an identical electromagnetic actuator.

14. A range of solenoid spool valves as claimed in claim 13, wherein each of the solenoid spool valves has a different first piston diameter, and the same second piston diameter.

15. A solenoid spool valve including:
   a spool valve having a sleeve provided with a supply pressure port, a control pressure port, an exhaust port and a spool supported in the sleeve for axial displacement within the sleeve; and
   an electromagnetic actuator for providing an axial drive force to said spool in a first axial direction;
   wherein the spool has a first piston with a first land for opening/closing the supply pressure port to/from fluid communication with the control pressure port and a second piston with a second land for opening/closing the exhaust port to/from fluid communication with the control pressure port,
   the first piston having a larger piston face surface area in fluid communication with the control pressure port than does the second piston to reduce leakage from the control pressure port to the exhaust pressure port; and
   a feedback orifice to equalize pressure on equal and opposite face surface areas of the first piston, wherein the spool is arranged such that, for every stationary position of the spool valve, a combined force on the spool from fluid against piston faces of the spool is independent of a transverse extent of the first piston.

* * * * *